US008157347B2

(12) United States Patent
Inamoto et al.

(10) Patent No.: US 8,157,347 B2
(45) Date of Patent: Apr. 17, 2012

(54) INK JET RECORDING HEAD AND INK JET RECORDING HEAD CARTRIDGE

(75) Inventors: Tadayoshi Inamoto, Tokyo (JP); Yoshiaki Kurihara, Kawasaki (JP); Masako Shimomura, Yokohama (JP); Satoshi Shimazu, Kawasaki (JP); Kazuto Takashima, Sayama (JP); Ikumi Sakata, Sayama (JP); Koji Tomita, Sayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 11/480,981

(22) Filed: Jul. 6, 2006

(65) Prior Publication Data

US 2007/0064059 A1 Mar. 22, 2007

(30) Foreign Application Priority Data

Jul. 8, 2005 (JP) ................................ 2005-200221
Jul. 8, 2005 (JP) ................................ 2005-200946

(51) Int. Cl.
*B41J 2/165* (2006.01)
*B41J 2/175* (2006.01)
*B32B 33/00* (2006.01)

(52) U.S. Cl. ............................ 347/22; 347/86; 428/41.5

(58) Field of Classification Search .................... 347/86, 347/64, 22; 428/355 AC, 41.5
See application file for complete search history.

(56) References Cited

U.S. PATENT DOCUMENTS 3,740,366 A * 6/1973 Sanderson .................... 524/398
4,688,052 A 8/1987 Inamoto et al. ............... 346/140
4,688,053 A 8/1987 Noguchi et al. .............. 346/140
4,688,054 A 8/1987 Inamoto et al. ............... 346/140
4,716,945 A 1/1988 Aoki et al. ........................ 141/1
4,983,656 A * 1/1991 Ito et al. ........................ 524/109
5,086,307 A 2/1992 Noguchi et al. .............. 346/140
5,384,341 A * 1/1995 Itagaki et al. ................. 522/111
5,558,975 A 9/1996 Noguchi et al. ........... 430/283.1
5,563,640 A * 10/1996 Suzuki ............................ 347/45
5,571,659 A 11/1996 Noguchi et al. ........... 430/284.1
5,578,417 A 11/1996 Noguchi et al. ........... 430/280.1
5,578,418 A 11/1996 Noguchi et al. ........... 430/280.1
5,855,656 A * 1/1999 Gundlach et al. .......... 106/31.43
7,332,219 B2 * 2/2008 Shirai et al. ............. 428/355 AC
7,645,813 B2 1/2010 Kohara
2002/0061948 A1 * 5/2002 Murakami et al. ............ 524/317
2002/0151627 A1 * 10/2002 Matsushima ................. 524/261
2003/0052939 A1 * 3/2003 Farr et al. ......................... 347/29
2004/0247864 A1 * 12/2004 Spies et al. .............. 428/355 BL
2005/0004261 A1 * 1/2005 Yatake .......................... 523/160

FOREIGN PATENT DOCUMENTS

EP 0 503 497 9/1992
JP 64-185 A 1/1989
JP 4-150865 A 5/1992
JP 5-9449 A 1/1993
JP 5-77435 A 3/1993

(Continued)

*Primary Examiner* — Stephen Meier
*Assistant Examiner* — Sarah Al Hashimi
(74) *Attorney, Agent, or Firm* — Fitzpatrick, Cella, Harper and Scinto

(57) ABSTRACT

An ink jet recording head comprising a discharge port for discharging an ink; and a sealing tape for sealing the discharge port; wherein the sealing tape includes a pressure-sensitive adhesive layer constituted of an acrylic crosslinked polymer formed by crosslinking an alkyl(meth)acrylate ester copolymer with a metal chelate compound, and is peelably adhered, through the pressure-sensitive adhesive layer, to a part where the discharge port is formed.

8 Claims, 4 Drawing Sheets

FOREIGN PATENT DOCUMENTS

| | | | | |
|---|---|---|---|---|
| JP | 5-77436 | | | 3/1993 |
| JP | 8-244234 | A | | 9/1996 |
| JP | 9-208910 | A | | 8/1997 |
| JP | 9-230138 | A | | 9/1997 |
| JP | 11-268284 | A | | 10/1999 |
| JP | 2000044900 | A | * | 2/2000 |
| JP | 2001-240830 | A | | 9/2001 |
| JP | 3334899 | B2 | | 8/2002 |
| JP | 2003-129022 | A | | 5/2003 |
| JP | 2005-15706 | A | | 1/2005 |
| JP | 2005-146151 | A | | 6/2005 |

* cited by examiner

INK JET RECORDING HEAD AND INK JET RECORDING HEAD CARTRIDGE

BACKGROUND OF THE INVENTION

1. Field of the Invention

The present invention relates to an ink jet recording head for use in an ink jet recording method for executing a recording by discharging an ink, and an ink jet recording head cartridge constituted of a recording head and an ink therefor.

2. Related Background Art

An ink jet printing method is a recording method of generating an ink droplet and depositing it on a print medium such as a paper thereby achieving a printing. An ink jet recording head utilized in such printing method is provided with an aperture, called a discharge port, through which the ink is discharged.

For protecting the discharge port of the ink jet recording head during transportation, there are proposed a method of providing a cap-shaped protective member, and a method of sealing the discharge port with a sticky tape or a hot-melt tape as a discharge port protecting tape.

Japanese Patent Application Laid-open No. H05-77436 (Patent Reference 1) discloses a sealing method for the discharge port, utilizing a sealing tape employing an acrylic crosslinked polymer formed by crosslinking an acrylic copolymer with an isocyanate. The acrylic copolymer is constituted of an alkyl acrylate ester containing an OH group, and an alkyl acrylate ester having an alkyl chain containing 4 to 9 carbon atoms. In such acrylic copolymer, an ink resistance is improved by forming a high-molecular polymer by a crosslinking reaction of the OH groups and an isocyanate, thereby elevating a cohesive force. Besides the sealing tape, disclosed in the patent reference 1 is coated, on a surface thereof to be adhered to an article, with a fluorine-containing low-molecular compound and a high-molecular compound, thus showing a high water repellency.

SUMMARY OF THE INVENTION

However, the discharge port sealing method, utilizing the aforementioned prior sealing tape employing the acrylic crosslinked polymer, crosslinked with the isocyanate compound, may involve following drawbacks.

When the sealing tape, employing the acrylic crosslinked polymer, crosslinked with the isocyanate compound, is used on a recording head for discharging a fine liquid droplet, a satisfactory printing may not be obtained after the transportation. This is presumably because, when the sealing tape is peeled off from a discharge port-bearing face (also called a front face or a discharge port face) of the recording head, the pressure-sensitive adhesive remains on such face whereby a discharged ink droplet is twisted and does not land on a desired position, thereby inducing a deterioration of the printed image. Such remaining of the pressure-sensitive adhesive is presumably caused by a partial cohesive failure of the pressure-sensitive adhesive layer. Such phenomenon may become a problem in the case that an ink is present in the recording head during transportation and comes into contact with the pressure-sensitive adhesive of the sealing tape.

Such remaining pressure-sensitive adhesive exists in a very small amount, which is in a level of not causing a problem in a recording head with a discharge amount more than 10 picoliters. However, the remaining pressure-sensitive adhesive of such a very small amount may induce a defective printing in an ink jet recording head, of which the ink droplet is made as small as about 2 pl (picoliter, or $10^{-12}$ liter) in order to realize a high-quality color recording comparable to a silver halide-based photograph.

Also in the case that the discharge port face of the ink jet recording head does not have a very high water repellency, as represented by a contact angle of 80-105°, the pressure-sensitive adhesive and the discharge port face show an increasing affinity during the transportation, whereby the peeling force (force required for peeling) increases gradually. As a result, the peeling operation of the sealing tape may cause damage on the discharge port face, thereby eventually resulting in a deformation or a crack. Such phenomenon may appear noticeably, particularly when the member constituting the discharge port is a material of a relatively low mechanical strength, such as a resin.

An object of the present invention is, in order to solve the aforementioned drawback, to seal the discharge port with a sealing tape utilizing a novel pressure-sensitive adhesive, thereby providing an ink jet recording head of a low cost and a high reliability.

The aforementioned object can be accomplished, in the ink jet recording head of the present invention, by utilizing, as a sealing tape for sealing a discharge port, a sealing tape employing an acrylic crosslinked copolymer, which is prepared by crosslinking a copolymer of an alkyl(meth)acrylate ester with a metal chelate compound.

More specifically, the ink jet recording head of the present invention includes a discharge port for discharging an ink, an energy generating element for causing an ink discharge from the discharge port, and a sealing tape for sealing the discharge port, wherein the sealing tape includes a pressure-sensitive adhesive layer constituted of an acrylic crosslinked copolymer, which is prepared by crosslinking a copolymer of an alkyl(meth)acrylate ester with a metal chelate compound an acrylic crosslinked copolymer, which is prepared by crosslinking a copolymer of an alkyl(meth)acrylate ester with a metal chelate compound, and is peelably adhered to a part in which the discharge port is formed, across the pressure-sensitive adhesive layer.

Therefore the pressure-sensitive adhesive does not remain in the front face and in the discharge port even after the transportation, and a droplet landing error is not induced even in a recording head in which the discharge port is made smaller for obtaining a smaller liquid a droplet for the purpose of attaining a high image quality, whereby an ink jet recording head of a high quality may be obtained.

Also a crosslinking with a metal chelate compound allows to select a copolymer of a (meth)acrylate ester not containing an OH group. As a result, the copolymer of such (meth) acrylate ester shows an improved storability after the copolymerization, since a crosslinking point does not vanish, after the copolymerization, by a OH—COOH condensation reaction. Also the degree of crosslinking can be stabilized at the stabilization with the metal chelate compound (at the formation of the sealing tape), whereby the ink resistance can be improved.

Also by copolymerizing a macromonomer having a copolymerizable functional group with the copolymer of such (meth)acrylate ester to form a graft polymer, the cohesive force is improved whereby the pressure-sensitive adhesive is not destructed by cohesive failure and the pressure-sensitive adhesive does not remain even on a surface with a poor water repellency. Therefore, even in a recording head in which the discharge port is made even smaller for obtaining a smaller liquid droplet, defects in recording resulting for example from a pressure-sensitive adhesive remaining around the discharge port are not induced, whereby an ink jet recording head of a high quality can be obtained.

DETAILED DESCRIPTION OF THE PREFERRED EMBODIMENTS

In the following, the present invention will be clarified by embodiments thereof, with reference to the accompanying drawings. Throughout the drawings, constitutions of an equivalent function will be represented by a same number, and may not be explained in repetition.

Figure 1:
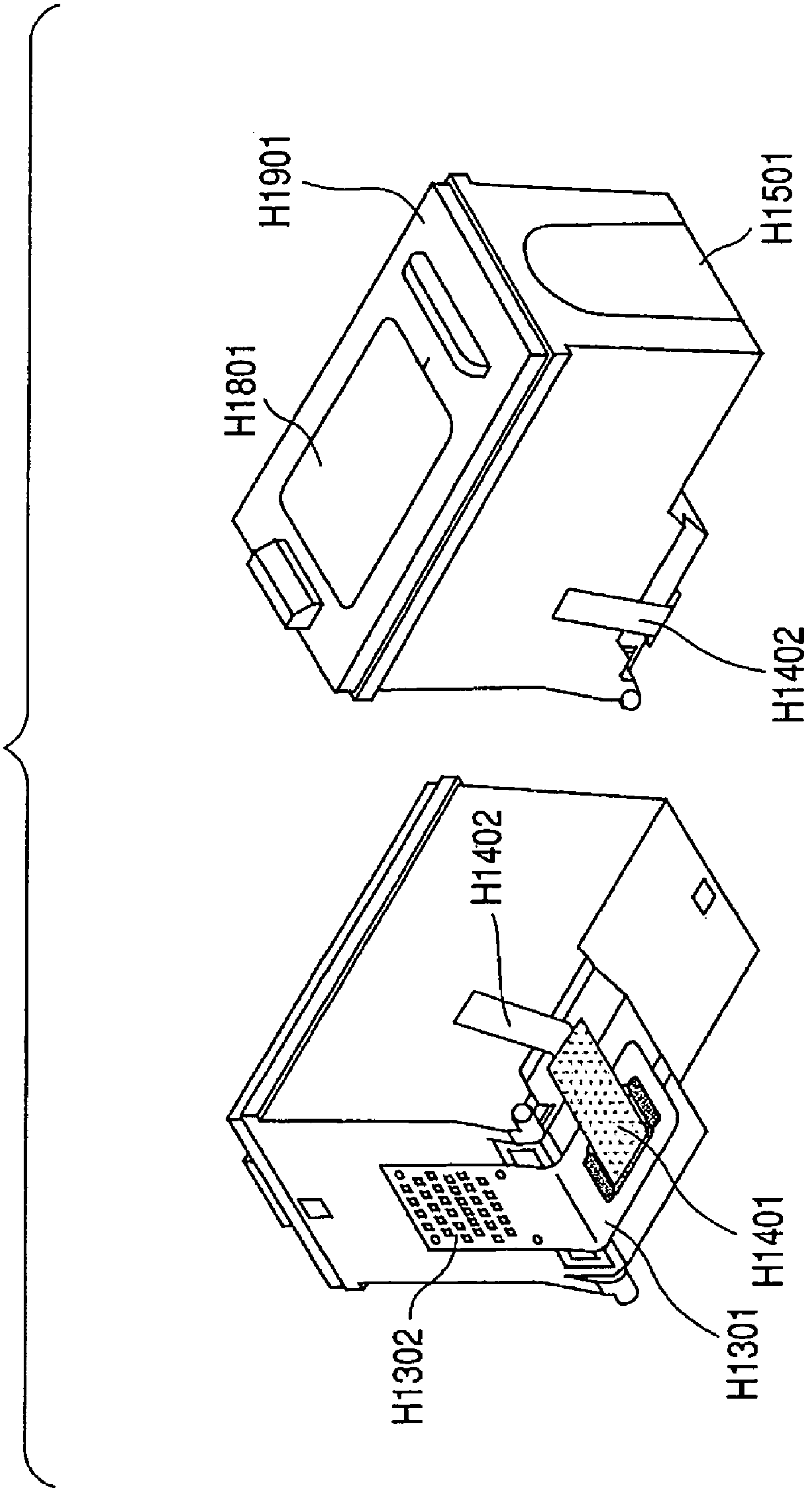
FIG. 1 is a perspective view showing an ink jet recording head with an adhered sealing tape, constituting an embodiment of the present invention.

FIG. 1 shows an ink jet recording head embodying the present invention. The ink jet recording head is illustrated in an integral type, combined with an ink tank constituting an ink supply-holding member. The ink supply-holding member H1501 is filled with an ink, and a discharge port sealing tape H1401 is adhered to a discharge face so as to cover at least discharge ports H1102. Thus FIG. 1 illustrates an ink jet recording head for packaging, in which the discharge ports are sealed by a sealing tape. Naturally, such configuration is applicable also to an ink jet recording head, separated from an ink tank, as shown in FIG. 4. In the following each constituent component will be explained in detail.

(Recording Head)

Figure 2:
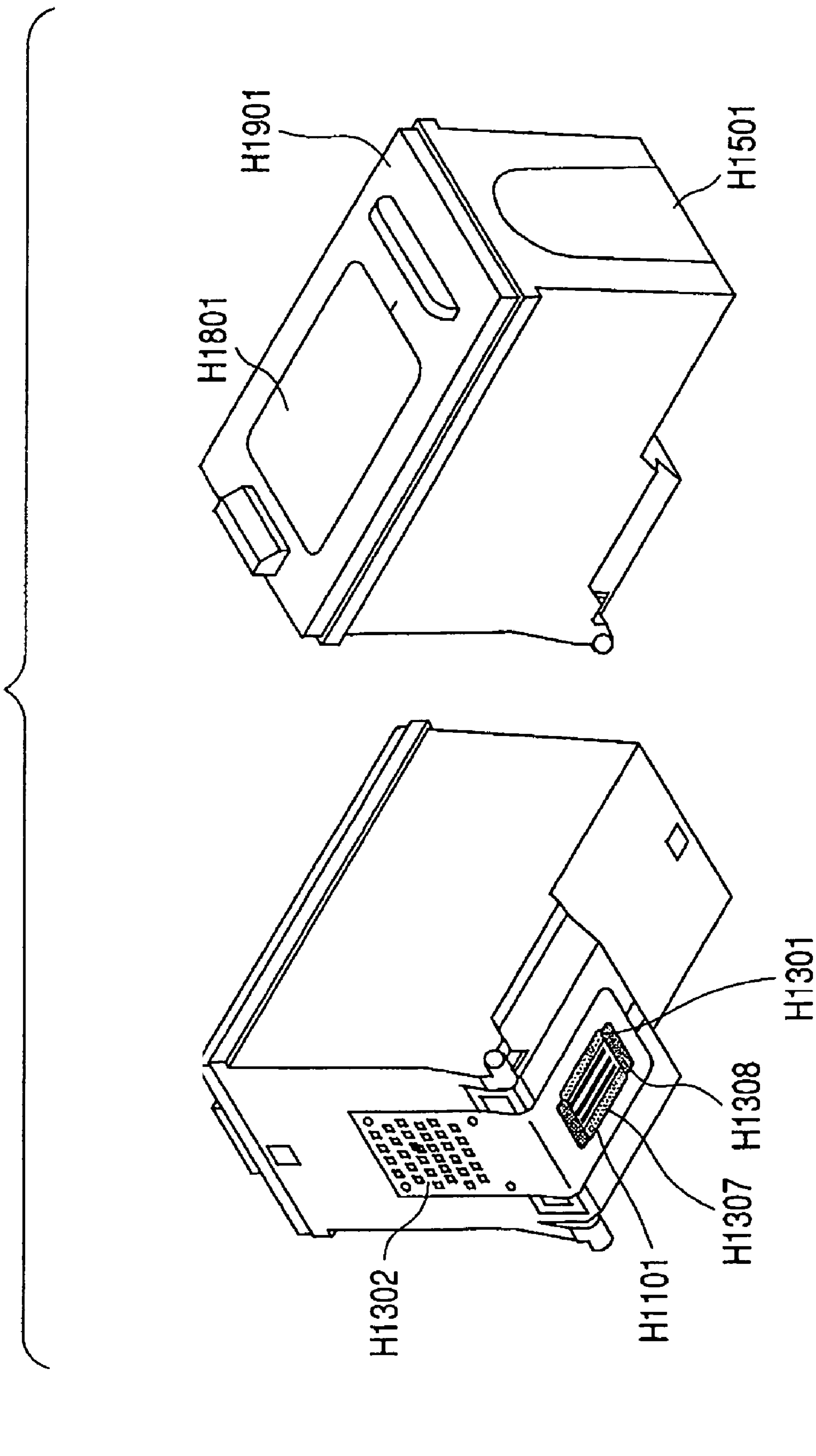
FIG. 2 is a perspective view showing an ink jet recording head.
Figure 3:
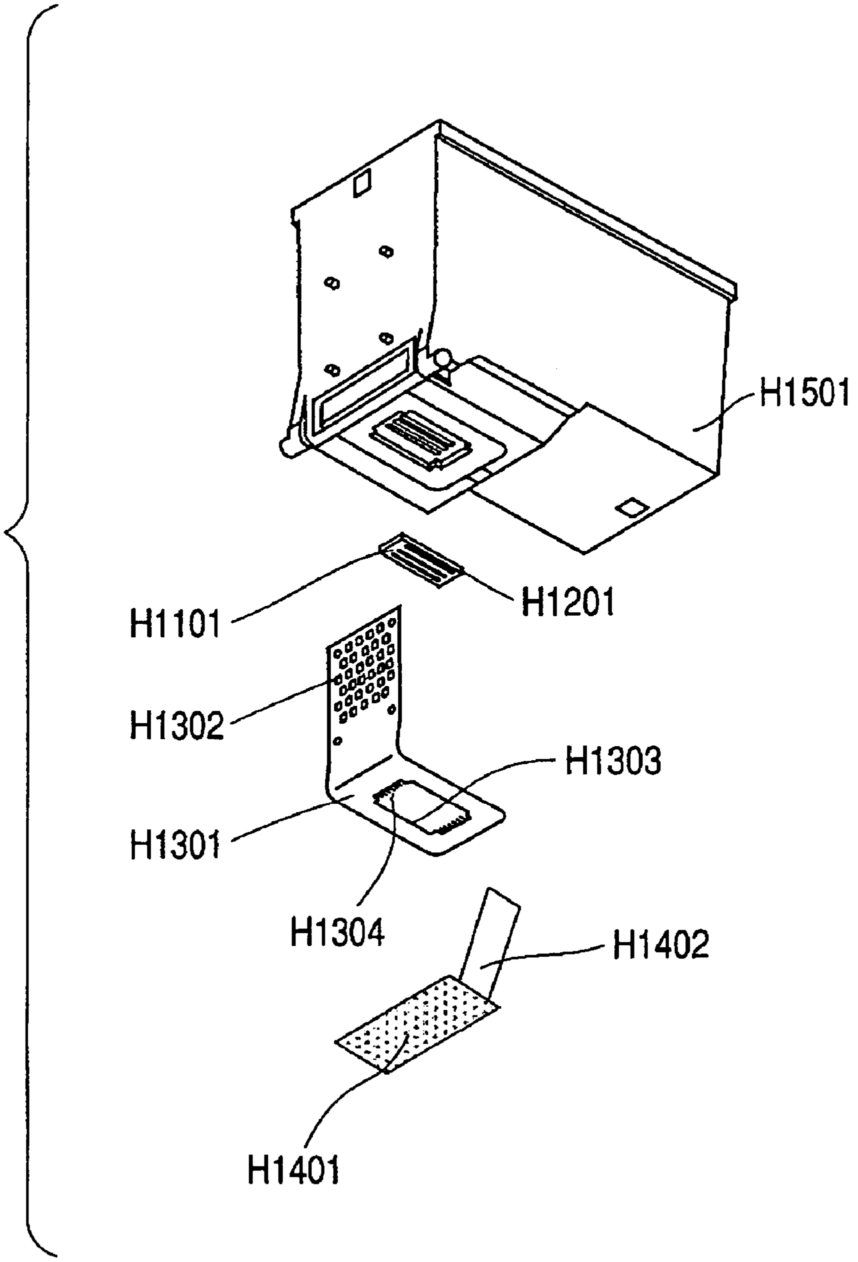
FIG. 3 is an exploded view of an ink jet recording head.

FIG. 2 is a perspective view showing the structure of the ink jet recording head H1001 in a state without the sealing tape, and FIG. 3 is an exploded perspective view of the ink jet recording head in a packaging state, as shown in FIG. 1. The ink jet recording head H1001 is constituted of a recording element substrate H1101, an electric wiring tape H1301, and an ink supply-holding member H1501. The ink supply-holding member H1501 holds an ink therein, and is provided with an ink path H1201 for communication of the internal ink with the exterior. The recording element substrate H1101 is provided with an ink supply aperture (not shown) for example by a sand blasting or by an anisotropic etching. On the recording element substrate H1101, ink flow paths (not shown) and discharge ports H1102 are formed by a photolithographic process. The ink in the ink supply-holding member H1501 is guided, through the ink path H1201, the ink supply aperture and the ink flow paths, to the ink discharge ports H1102. Also a water-repellent layer (not shown) is formed on a surface, bearing the discharge ports H1102, of the recording element substrate H1101. The sealing tape of the present invention is advantageously on a discharge port face (surface for adhering sealing tape) having a forward water contact angle of 80-105°. In the illustrated recording head, the forward water contact angle is adjusted to 100° by the water-repellent layer.

The electric wiring tape H1301 forms paths for guiding ink-discharging electrical signals, to the recording element substrate H1101, and is constituted of copper wirings formed on a polyimide film.

At the transportation of the recording head, a sealing tape H1401 for sealing the discharge ports and a tag tape H1402, for facilitating peeling of the sealing tape H1401, are adhered as shown in FIG. 1. Covering the discharge port with the sealing tape not only seals the discharge port but also prevents an ink leakage from the discharge port by a change in the temperature and the pressure during the transportation.

Figure 4A:
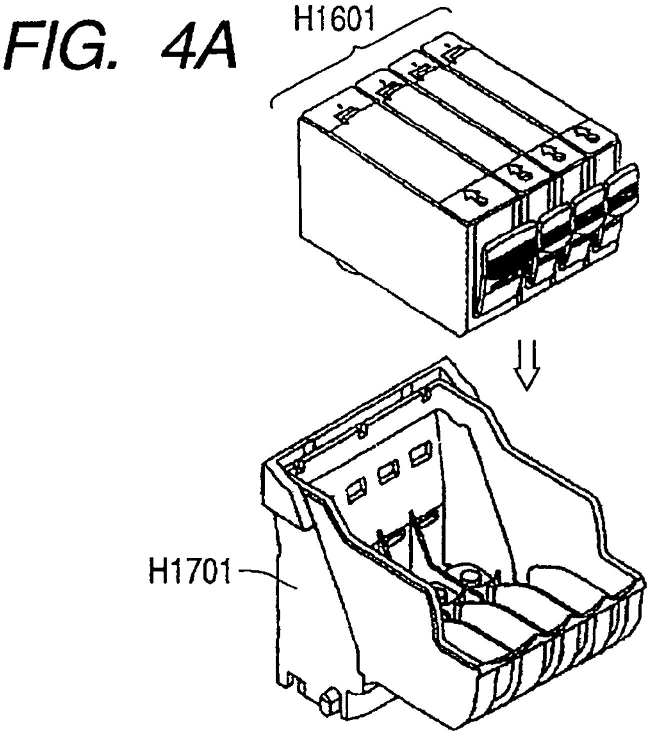
FIGS. 4A and 4B are perspective views showing an ink jet recording head of the present invention.
Figure 4B:
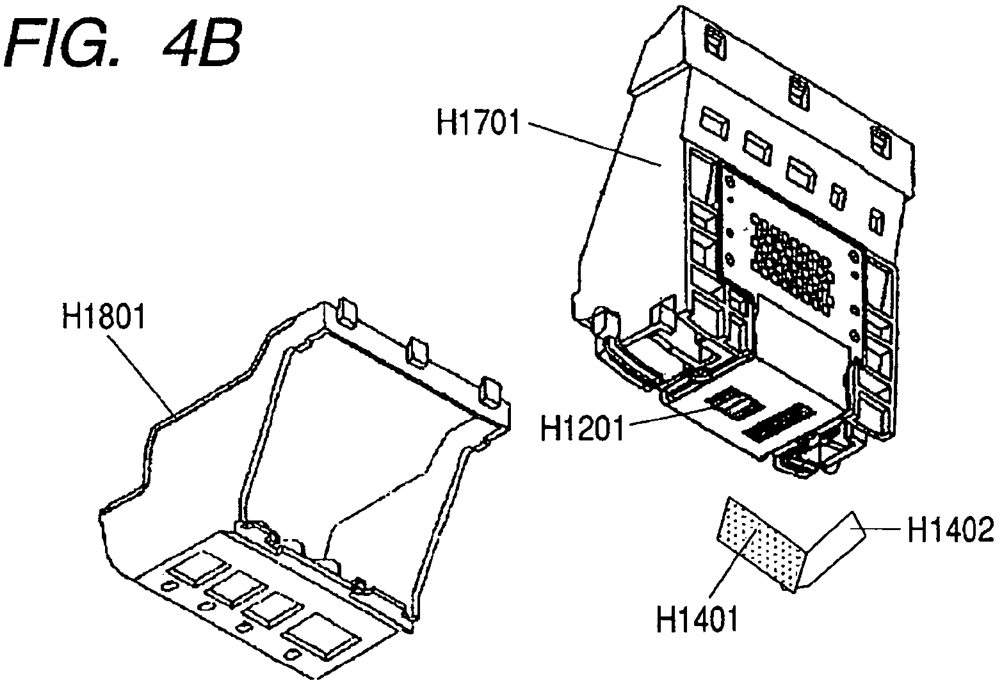

FIGS. 4A and 4B show a structure in which an ink tank H1601 and an ink jet recording head H1701 are separable each other. FIG. 4A is a perspective view seen from above, and FIG. 4B is a perspective view seen from the side of discharge ports 1102. The present invention is applicable also in such case. The ink jet recording head H1701 is also provided with a separable tank holder.

The sealing tape of the present invention is constituted of a resinous film constituting a substrate, and a layer of an acrylic resin-based pressure-sensitive adhesive. The resinous film constituting the substrate may be formed by any material capable of providing a function as a sealing tape, and may be formed, for example, of polyethylene terephthalate, polypropylene, or polyethylene. A preferred example is polyethylene terephthalate. A surface of the resinous film, on which the pressure-sensitive adhesive layer is to be provided, may be subjected to a surface treatment such as a plasma treatment or a corona discharge treatment, commonly employed for improving the adhesion of the pressure-sensitive adhesive layer. A thickness of the substrate may be selected within a range of from 7 to 75 μm, preferably from 12 to 30 μm. Also a thickness of the pressure-sensitive adhesive layer may be selected within a range of from 5 to 50 μm, preferably from 10 to 40 μm.

The pressure-sensitive adhesive, for forming the pressure-sensitive adhesive layer in the sealing tape of the present invention, includes an acrylic crosslinked polymer prepared by crosslinking an alkyl(meth)acrylate ester copolymer with a metal chelate compound.

The alkyl(meth)acrylate ester copolymer preferably includes at least monomer units obtained from an alkyl(meth) acrylate ester and a carboxyl group-containing monomer.

A more preferable example of the copolymer is a copolymer constituted, as monomer components, at least of an alkyl (meth)acrylate ester, a carboxyl group-containing monomer and a copolymerizable macromonomer. In addition to these three monomer components, another polymerizable monomer may be copolymerized if necessary.

Examples of the alkyl(meth)acrylate ester monomer include an ester formed from (meth)acrylic acid and an alcohol having an alkyl chain (group) including 1 to 12 carbon atoms, particularly preferably 2 to 6 carbon atoms. Examples of the alkyl(meth)acrylate ester include following compounds:

methyl acrylate, ethyl acrylate, propyl acrylate, isopropyl acrylate, butyl acrylate, isobutyl acrylate, isoamyl acrylate, 2-ethylhexyl acrylate, isooctyl acrylate, decyl acrylate, isodecyl acrylate, lauryl acrylate, methyl methacrylate, ethyl methacrylate, propyl methacrylate, isopropyl methacrylate, butyl methacrylate, isobutyl methacrylate, isoamyl methacrylate, 2-ethylhexyl methacrylate, isooctyl methacrylate, decyl methacrylate, isodecyl methacrylate, and lauryl methacrylate.

Examples also include a cycloalkyl(meth)acrylate such as cyclohexyl acrylate. In consideration of adhesivity to the adhered face (front face) and a matching with a following cohesive component, butyl acrylate is preferable, and it is preferable either to use butyl acrylate singly or to use butyl acrylate principally, with a small amount of another monomer in combination. In the ratio with other components, such pressure-sensitive adhesive component is preferably employed within a range of from 75 to 96.9 wt %. Such pressure-sensitive adhesive component may be employed either singly or in a combination of plural kinds, as long as it is within the aforementioned range.

Examples of the carboxyl group-containing monomer include acrylic acid, methacrylic acid, maleic acid, crotonic acid, β-carboxyethyl acrylate, 5-carboxypentyl acrylate, itaconic acid and fumaric acid. The carboxyl group-containing monomer may be employed either singly or in a combination of two or more kinds, and is preferably employed within a range of from 0.1 to 5 wt % with respect to the total amount of all the monomers. An amount exceeding this range increases the cohesive force to reduce the adhesive force, thereby inducing an ink leakage or the like when applied to the ink jet recording head. Also an amount less than this range cannot obtain the effect of the present invention, as a crosslinked structure cannot be obtained.

Also an acrylic compound including an OH group may also be employed, through it has a lower reactivity in comparison with the COOH group. Examples of a monomer including an OH group include following compounds:

2-hydroxyethyl acrylate, 2-hydroxypropyl acrylate, hydroxybutyl acrylate, 2-hydroxyethyl methacrylate, 2-hydroxypropyl methacrylate, hydroxybutyl methacrylate, polyhydric alcohol acrylate ester, polyhydric alcohol methacrylate ester, ethylcarbitol acrylate.

The copolymerizable macromonomer is a monomer of a relatively large molecular weight, having a copolymerizable functional group at a terminal end. Examples of the macromonomer include polymethyl methacrylate, polystyrene, and polystyrene-acrylonitrile, having a methacryloyl group at a terminal end. Such macromonomer preferably has a number-average molecular weight within a range of from 2,000 to 20,000. The macromonomer may be employed either singly or in a combination or two or more kinds. In consideration of an ink resistance and a viscosity increase during the polymerization, it is preferably employed within a range of from 3 to 10 wt % with respect to the total amount of the monomers.

Examples of other copolymerizable unsaturated monomer include followings:

an alkoxy alkyl(meth)acrylate such as 2-methoxyethyl acrylate or 2-ethoxyethyl acrylate; an aromatic-containing (meth)acrylate such as benzyl acrylate; a hydroxyalkyl(meth) acrylate such as dicyclopentenyl acrylate, dicyclopentanyl acrylate, dicyclopentanyl methacrylate, 2-hydroxyethyl acrylate, 2-hydroxybutyl acrylate, 6-hydroxyhexyl acrylate, 8-hydroxyoctyl acrylate, 10-hydroxydecyl acrylate, 2-hydroxyethyl methacrylate or 2-hydroxypropyl methacrylate; acrylamide, methacrylamide, vinyl acetate, styrene, α-methylstyrene and acrylonitrile.

One or more of these compounds may be added up to 10 wt % with respect to the total amount of all the monomers.

A preferable composition is summarized below:

alkyl(meth)acrylate ester: 75-96.9 wt %;
carboxyl group-containing monomer: 0.1-5 wt %;
copolymerizable macromonomer: 3-10 wt %; and
another copolymerizable monomer: 0-10 wt %.

The alkyl(meth)acrylate ester copolymer can be produced for example by charging the monomers above in a reaction solvent, replacing the air in the reaction system with an inert gas such as nitrogen gas, and executing a polymerization reaction by agitation under heating, in the presence of a polymerization initiator.

The reaction solvent to be employed is an organic solvent, of which specific examples are shown below:

an aromatic hydrocarbon such as toluene or xylene, an aliphatic hydrocarbon such as n-hexane, an ester such as ethyl acetate or butyl acetate, and a ketone such as methyl ethyl ketone, methyl isobutyl ketone or cyclohexanone.

Also examples of the usable polymerization initiator include an azo-type polymerization initiator such as azobisisobutyronitrile, and an organic peroxide such as benzoyl peroxide, di-tert-butyl peroxide or cumene hydroperoxide.

The polymerization reaction is executed at a reaction temperature of normally from 50 to 90° C. and a reaction time of normally from 2 to 20 hours and preferably from 4 to 12 hours.

Also the reaction solvent is used in an amount of from 50 to 300 parts by weight, with respect to a total amount of 100 parts by weight of the components. Also the polymerization initiator is employed in an amount of normally from 0.01 to 10 parts by weight. By such reaction, the copolymer constituting the pressure-sensitive adhesive layer of the present invention is obtained as a solution or a dispersion, containing the copolymer in an amount of from 15 to 70 wt % in the reaction solvent.

The copolymer constituting the pressure-sensitive adhesive layer of the present invention has a weight-average molecular weight within a range from 400,000 to 1,500,000. A weight-average molecular weight less than the aforementioned range results in an excessively high adhesive force, thus significantly deteriorating the re-peeling property of the adhesive and easily causing the adhesive to remain on the adhered object. Also it facilitates intrusion of the ink into the pressure-sensitive adhesive layer, thus deteriorating the ink resistance. Also a weight-average molecular weight exceeding the aforementioned range weakens the adhesion of the pressure-sensitive adhesive layer to the substrate, thereby tending to cause the adhesive to remain on the adhered object, and also reduces the adhesive force to deteriorate the sealing property.

A sealing tape of a superior quality can be obtained by crosslinking the alkyl(meth)acrylate ester copolymer, at the coating thereof on the substrate, with a metal chelate crosslinking agent (metal chelate compound).

Examples of the metal chelate compound include compounds of polyvalent metal such as aluminum, iron, copper, zinc, tin, titanium, nickel, antimony, magnesium, vanadium, chrome, or zirconium to which an alkoxide, acetylacetone or ethyl acetoacetate is coordinated. Among these, aluminum chelate compounds are particularly preferable, and following ones may be employed preferably:

aluminum isopropylate, aluminum secondary butyrate, aluminum ethyl acetoacetate-diisopropylate, aluminum trisethyl acetoacetate and aluminum trisacetyl acetonate.

The metal chelate crosslinking agent is preferably employed within a range of from 1 to 20 parts by weight, with respect to 100 parts by weight of alkyl(meth)acrylate ester copolymer. Such range is preferable in attaining a crosslinked structure effective for blocking an ink intrusion, thereby realizing a sufficient ink resistance. Further, it is not preferable to exceed such range, since the adhesive force becomes high and the re-peeling property becomes lowered. Furthermore, if an excessive amount of agent is added to exceed the range, it may unfavorably happen that a metal chelate compound is dissolved out into ink.

Formation of a pressure-sensitive adhesive layer on the substrate, while crosslinking the alkyl(meth)acrylate ester copolymer, may be achieved for example by a following method. There can be utilized a method of dissolving the alkyl(meth)acrylate ester copolymer, obtained by the copolymerization reaction, in a solvent such as ethyl acetate to obtain a solution, then adding thereto a necessary amount of the metal chelate compound to obtain a coating liquid, then coating it on a substrate and drying it under heating. The substrate preferably has a thickness of from 12 to 30 μm. Also a coating amount of the coating liquid on the substrate is preferably so selected that the pressure-sensitive adhesive layer has a thickness of about from 10 to 40 μm after drying under heating.

After the coating and drying steps of the pressure-sensitive adhesive, a PET film having a silicone-based releasing material may be adhered onto the pressure-sensitive adhesive as a separator, for facilitating the handling.

Particularly in the case that the ink contains a compound, functioning as a chelating agent, as will be explained later, such chelating compound in the ink may react with an uncrosslinked part of the pressure-sensitive adhesive. In such case, it is particularly preferable to utilize a sealing tape in which the pressure-sensitive adhesive has a gel fraction of 85% or higher.

The commercially available ink tanks, filled with the inks for ink jet recording heads, are formed by molding resins such as polypropylene or polyethylene. In the case of utilizing such material for the ink tank, a trace metal, contained in an additive in the molding resin may dissolve out into the ink. Such metal dissolution into the ink may occur also when a filter member, employed in the ink tank, contains a metal. For this reason, in order to prevent that thus dissolved metal is precipitated in the vicinity of the discharge port and induces an ink discharge failure, there is employed a method of adding a chelating agent in the ink to form a complex with the dissolved metal, thereby increasing the solubility thereof.

Following compounds are known as the chelating agent to be used in such case, such as citric acid, a citrate salt, EDTA (ethylene diamine tetraacetic acid salt), oxalic acid, an amino acid such as glycine, gelatin, polyvinyl alcohol, diethylene triamine, iminodiacetic acid, methionine, and imidazole.

Among these, citric acid, a citrate salt such as sodium citrate, and triethanolamine are often utilized.

Therefore, in consideration of the aforementioned case, the pressure-sensitive adhesive is made to have a gel fraction of 85% or higher, thereby minimizing the uncrosslinked part and thus suppressing the reaction with the compound functioning as a chelating agent in the ink.

It is thus possible to further improve the reliability of the sealing tape.

Also as the reaction of the pressure-sensitive adhesive and the chelating agent in the ink is considered to reduce the effect that the chelating agent prevents the precipitation of the dissolved metal in the ink by a chelating reaction therewith, it is preferable, also from this point, that the pressure-sensitive adhesive has a gel fraction of 85% or higher.

An adjustment to a desired gel fraction is possible, for example, after the solution of the copolymer and the metal chelate compound in the solvent is coated with a predetermined thickness on the substrate film, by regulating time and temperature in a heat drying step of thus coated layer. This is because the crosslinking reaction is considered to proceed at the heat drying operation. Particularly preferred are a drying temperature of 90° C. or higher and a drying time of 4 minutes or longer.

The proceeding of the crosslinking reaction can be confirmed, utilizing a head space GC/MS, by a remaining amount of a compound, generated when the crosslinking agent reacts with COOH group (acetylacetone in case of utilizing aluminum trisacetylacetonate). It is also possible to immerse the tape in a solvent such as acetone and to measure an amount of the remaining crosslinking agent that is dissolved out, by a LC/MS.

The gel fraction of the pressure-sensitive adhesive layer is considered to be an effective index for judging a level of proceeding of the crosslinking reaction that affects the remaining amount of the adhesive, and also judging the quality of materials (alkyl(meth)acrylate ester copolymer and crosslinking agent).

The gel fraction represents a residual rate of the pressure-sensitive adhesive, obtained by immersing the tape in a solvent and measuring the weight before and after the immersion. According to an investigation conducted by the present inventors, it well matched the amount of the crosslinking agent remaining on the substrate, in case of immersion in tetrahydrofuran for 1 day (24 hours). It was also found that a pressure-sensitive adhesive showing a larger dissolution (pressure-sensitive adhesive remaining in a smaller amount on the substrate) more often generated a remaining of the adhesive when the tape was adhered to the ink jet recording head. Since an unreacted crosslinking agent and a low-molecular principal component are found in tetrahydrofuran after the immersion, the gel fraction is considered to comprehensively judge whether the crosslinking proceeds properly and whether the principal component is proper.

According to the investigation by the present inventors, a pressure-sensitive adhesive tape with a gel fraction of 85% or higher did not cause a defective printing by the remaining pressure-sensitive adhesive, even after a storage of 3 weeks at 70° C. or even on a recording head with a discharge amount of 2 pl or less. Also in combination with an ink containing a compound functioning as a chelating agent, no precipitation of a metal such as Al, Fe or Mg occurred at the discharge port.

In the following, the present invention will be clarified further by experimental examples.

Example 1

Sealing Tape A

A reactor equipped with an agitator, a reflux condenser, a thermometer and a nitrogen introducing tube was charged with 80 parts by weight of butyl acrylate, 15 parts by weight of ethyl acrylate, 2 parts by weight of acrylic acid, 3 parts by weight of a methyl methacrylate macromonomer having a methacryloyl group at a terminal end (trade name: AA-6, manufactured by Toa Gosei Co., Mn: 6,000), and 150 parts by weight of ethyl acetate.

Then 0.2 parts of azobisisobutyronitrile were added, and a polymerization reaction was conducted at 68° C. for 8 hours under a nitrogen flow. After the reaction, the reaction liquid was diluted with ethyl acetate to a solid concentration of 20 wt % thereby obtaining a copolymer liquid of a viscosity of 7,000 cp and a weight-average molecular weight of 1,100,000. In the copolymer liquid, 3 parts by weight of aluminum trisacetylacetonate as a crosslinking agent were added, with respect to 100 parts by weight of the copolymer to obtain a pressure-sensitive adhesive composition.

The pressure-sensitive adhesive composition was coated on a polyethylene terephthalate film of a thickness of 25 μm and dried under heating to obtain a sealing tape A with a pressure-sensitive adhesive layer of a thickness of 30 μm.

Example 2

Sealing Tape B

A reactor equipped with an agitator, a reflux condenser, a thermometer and a nitrogen introducing tube was charged with 80 parts by weight of butyl acrylate, 10 parts by weight of ethyl acrylate, 2 parts by weight of acrylic acid, 3 parts by weight of a methyl methacrylate macromonomer having a methacryloyl group at a terminal end (trade name: AA-6, manufactured by Toa Gosei Co., Mn: 6,000), 5 parts by weight of 2-hydroxyethyl acrylate and 150 parts by weight of ethyl acetate.

Then 0.2 parts of azobisisobutyronitrile were added, and a polymerization reaction was conducted at 68° C. for 8 hours under a nitrogen flow. After the reaction, the reaction liquid was diluted with ethyl acetate to a solid concentration of 20 wt % thereby obtaining a copolymer liquid of a viscosity of 7,000 cp and a weight-average molecular weight of 1,000,000. In the copolymer liquid, 3 parts by weight of aluminum trisacetylacetonate as a crosslinking agent were added, with respect to 100 parts by weight of the copolymer to obtain a pressure-sensitive adhesive composition.

The pressure-sensitive adhesive composition was coated on a polyethylene terephthalate film of a thickness of 25 μm and dried under heating to obtain a sealing tape B with a pressure-sensitive adhesive layer of a thickness of 30 μm.

Example 3

Sealing Tape C

A reactor equipped with an agitator, a reflux condenser, a thermometer and a nitrogen introducing tube was charged with 51.5 parts by weight of butyl acrylate, 40 parts by weight of cyclohexyl acrylate, 3.5 parts by weight of acrylic acid, 5 parts by weight of a methyl methacrylate macromonomer having a methacryloyl group at a terminal end (trade name: AA-6, manufactured by Toa Gosei Co., Mn: 6,000), and 150 parts by weight of ethyl acetate.

Then 0.2 parts of azobisisobutyronitrile were added, and a polymerization reaction was conducted at 68° C. for 8 hours under a nitrogen flow. After the reaction, the reaction liquid was diluted with ethyl acetate to a solid concentration of 20 wt % thereby obtaining a copolymer liquid of a viscosity of 6,500 cp and a weight-average molecular weight of 800,000. In the copolymer liquid, 3 parts by weight of aluminum trisacetylacetonate as a crosslinking agent were added, with respect to 100 parts by weight of the copolymer, to obtain a pressure-sensitive adhesive composition.

The pressure-sensitive adhesive composition was coated on a polyethylene terephthalate film of a thickness of 25 μm and dried under heating to obtain a sealing tape C with a pressure-sensitive adhesive layer of a thickness of 30 μm.

Example 4

Sealing Tape D

A reactor equipped with an agitator, a reflux condenser, a thermometer and a nitrogen introducing tube was charged with 65 parts by weight of butyl acrylate, 25 parts by weight of ethyl acrylate, 3.5 parts by weight of acrylic acid, 1.5 parts by weight of methacrylic acid, 5 parts by weight of a methyl methacrylate macromonomer having a methacryloyl group at a terminal end (trade name: AA-6, manufactured by Toa Gosei Co., Mn: 6,000), and 150 parts by weight of ethyl acetate.

Then 0.2 parts of azobisisobutyronitrile were added, and a polymerization reaction was conducted at 68° C. for 8 hours under a nitrogen flow. After the reaction, the reaction liquid was diluted with ethyl acetate to a solid concentration of 20 wt % thereby obtaining a copolymer liquid of a viscosity of 6,800 cp and a weight-average molecular weight of 800,000. In the copolymer liquid, 6 parts by weight of aluminum trisacetylacetonate as a crosslinking agent were added, with respect to 100 parts by weight of the copolymer, to obtain a pressure-sensitive adhesive composition.

The pressure-sensitive adhesive composition was coated on a polyethylene terephthalate film of a thickness of 25 μm and dried under heating to obtain a sealing tape A with a pressure-sensitive adhesive layer of a thickness of 30 μm.

In the following, sealing tapes E-G are shown as comparative examples.

Comparative Example 1

Sealing Tape E

A reactor equipped with an agitator, a reflux condenser, a thermometer and a nitrogen introducing tube was prepared. In the reactor, 80 parts by weight of butyl acrylate, 10 parts by weight of acrylonitrile, and 10 parts by weight of 2-hydroxyethyl acrylate were subjected, in a mixed solvent of toluene and butyl acetate, to a solution polymerization at 85° C. for 8 hours, utilizing benzoyl peroxide as a catalyst, thereby obtaining a polymer liquid of a weight-average molecular weight of 300,000. Then ethanol was used to remove the monomer and the low polymerization product together with the solvent from the polymer liquid, which was then dried. The polymer liquid was dissolved anew in a mixed solvent of toluene and ethyl acetate, and added with 10.1 parts by weight of dicyclohexylmethane diisocyanate, with respect to 100 parts by weight of the polymer, to obtain a pressure-sensitive adhesive composition.

The pressure-sensitive adhesive composition was coated on a polyethylene terephthalate film of a thickness of 25 μm and dried under heating to obtain a sealing tape A with a pressure-sensitive adhesive layer of a thickness of 30 μm.

Comparative Example 2

Sealing Tape F

In the producing process for the sealing tape E, the molecular weight is made higher to obtain a polymer liquid of a weight-average molecular weight of 700,000, which was used for preparing a pressures-sensitive adhesive composition, and a sealing tape F was prepared with a same substrate and a same thickness of the adhesive layer as above.

Comparative Example 3

Sealing Tape G

In the producing process for the sealing tape E, a pressure-sensitive adhesive composition was prepared by a silicone pressure-sensitive adhesive principally constituted of dimethylsiloxane, obtained by an addition reaction, and a sealing tape G was prepared with a same substrate and a same thickness of the adhesive layer as above.

In the following, methods and results of evaluation will be explained (cf. Table 1).

Each of the sealing tapes A-G was cut into a desired size and adhered to the discharge port face of the ink jet recording head H1001 explained above. The ink jet recording head was designed to discharge an ink droplet of 2 pl, with the discharge ports having a diameter of 10 μm.

The ink jet recording head with the sealed discharge ports was packaged ad subjected to a dropping test and a 60° C. heating test. No ink leakage was observed in any of the sealing tapes.

Thereafter, the sealing tape was peeled off and the vicinity of the discharge ports was observed under a scanning electron microscope. Results of observation are shown in a discharge port state in Table 1. No remaining of the pressure-sensitive adhesive was observed in the sealing tapes A, B, C and D of the present invention.

The ink jet recording heads, after the peeling of the sealing tape, were mounted on a recording apparatus and subjected to a printing test. As shown in image evaluation result in Table 1, the sealing tapes A, B, C and D of the present invention provided satisfactory printing without a landing error of the ink. On the other hand, the sealing tapes E, F and G of the comparative examples could not provide satisfactory printing results. This is considered to result from a clogging of the discharge port and an ink droplet deviation by the remaining pressure-sensitive adhesive.

Also in the case of the sealing tape G, the resin layer constituting the nozzles was cracked and partially broken at the tape peeling, whereby the printing operation was not possible.

A peeling strength in Table 1 shows a result of measurement of a peeling force, as an index for a force required for peeling the sealing tape from the discharge port face of the ink jet recording head, on which the sealing tape is adhered. The measurement was conducted under following conditions. The discharge port face was subjected to a water-repellent treatment:

peeling speed: 165 mm/s peeling direction: 90°

The destruction of the resin layer, constituting a part of the nozzles, at the peeling of the sealing tape G, is presumably ascribable to a very high peeling strength as shown in Table 1.

TABLE 1

| | peeling strength N/25 mm | pressure-sensitive adhesive | cross-linking agent | state of dis-charge port | image |
|---|---|---|---|---|---|
| sealing tape A Example 1 | 2.5 | acrylic (polymer) | aluminum chelate | + | satisfactory |
| sealing tape B Example 2 | 5.7 | acrylic (polymer) | aluminum chelate | + | satisfactory |
| sealing tape C Example 3 | 2.2 | acrylic (polymer) | aluminum chelate | + | satisfactory |
| sealing tape D Example 4 | 2.0 | acrylic (polymer) | aluminum chelate | + | satisfactory |
| sealing tape E Comp. Ex. 1 | 6.3 | acrylic (polymer) | isocyanate | − | streak by no discharge |
| sealing tape F Comp. Ex. 2 | 4.8 | acrylic (polymer) | isocyanate | ±/− | streak by no discharge |
| sealing tape G Comp. Ex. 3 | 11.7 | silicone | — | nozzle broken | printing not possible |

Example 5

Sealing Tape H

A reactor equipped with an agitator, a reflux condenser, a thermometer and a nitrogen introducing tube was charged with 93 parts by weight of butyl acrylate, 3 parts by weight of 2-hydroxyethyl acrylate, 1 part by weight of acrylic acid, 3 parts by weight of a methyl methacrylate macromonomer having a methacryloyl group at a terminal end (trade name: AA-6, manufactured by Toa Gosei Co., Mn: 6,000), and 150 parts by weight of ethyl acetate.

Then 0.2 parts of azobisisobutyronitrile were added, and a polymerization reaction was conducted at 68° C. for 8 hours under a nitrogen flow. After the reaction, the reaction liquid was diluted with ethyl acetate to a solid concentration of 20 wt % thereby obtaining a copolymer liquid of a weight-average molecular weight of 1,100,000. In the copolymer liquid, 3 parts by weight of aluminum trisacetylacetonate as a crosslinking agent were added, with respect to 100 parts by weight of the copolymer, to obtain a pressure-sensitive adhesive composition.

The pressure-sensitive adhesive composition was coated on a polyethylene terephthalate film of a thickness of 20 μm and dried under heating at 100° C. for 4 minutes to obtain a sealing tape H with a pressure-sensitive adhesive layer of a thickness of 30 μm.

The prepared pressure-sensitive adhesive layer had a gel fraction of 85%.

Example 6

Sealing Tape I

A reactor equipped with an agitator, a reflux condenser, a thermometer and a nitrogen introducing tube was charged with 80 parts by weight of butyl acrylate, 15 parts by weight of ethyl acrylate, 2 parts by weight of acrylic acid, 3 parts by weight of a methyl methacrylate macromonomer having a methacryloyl group at a terminal end (trade name: AA-6, manufactured by Toa Gosei Co., Mn: 6,000), and 150 parts by weight of ethyl acetate.

Then 0.2 parts of azobisisobutyronitrile were added, and a polymerization reaction was conducted at 68° C. for 8 hours under a nitrogen flow. After the reaction, the reaction liquid was diluted with ethyl acetate to a solid concentration of 20 wt % thereby obtaining a copolymer liquid of a weight-average molecular weight of 1,100,000. In the copolymer liquid, 3 parts by weight of aluminum trisacetylacetonate (manufactured by Kawaken Fine Chemical Co.) as a crosslinking agent were added, with respect to 100 parts by weight of the copolymer, to obtain a pressure-sensitive adhesive composition.

The pressure-sensitive adhesive composition was coated on a polyethylene terephthalate film of a thickness of 20 μm and dried under heating at 100° C. for 4 minutes to obtain a sealing tape I with a pressure-sensitive adhesive layer of a thickness of 30 μm.

The prepared pressure-sensitive adhesive layer had a gel fraction of 90%.

Example 7

Sealing Tape J

The pressure-sensitive adhesive composition prepared in Example 6 was coated and dried on a PET film in the same manner as in Example 2, except that the composition was aged at 40° C. for 1 month, to obtain a sealing tape. The prepared pressure-sensitive adhesive layer had a gel fraction of 86%.

Comparative Example 4

Sealing Tape K

A process was executed in the same manner as in Example 6, except that the drying step under heating was conducted at 80° C. for 4 minutes. The prepared pressure-sensitive adhesive layer had a gel fraction of 75%.

Examples 5, 6, 7 and Comparative Example 4 were subjected to following evaluations.

<Evaluation>

A following ink formulation, in which % represents wt %, was used in the evaluations:

| [ink] | |
|---|---|
| Direct Blue 199 | 3% |
| ethylene urea | 5% |
| glycerin | 7% |
| ethylene glycol | 5% |
| Acetylenol EH | 1% |
| sodium citrate | 10 ppm |
| ion-exchanged water | 79% |

[Evaluation 1] Gel Fraction

About 0.5 g of a pressure-sensitive adhesive tape with a separator were weighed and immersed in THF of 20° C. for 24 hours (substrate and separator not being immersed), and dried in a reduced-pressure dryer of 25° C. until the weight no longer changed. A weight remaining ratio of the pressure-sensitive adhesive layer was calculated by measuring the weights of the separator and the substrate.

[Evaluation 2] Printing Evaluation

Each sealing tape was cut into a desired size and adhered to a discharge port face of an ink jet recording head. The ink jet recording head was designed to discharge an ink droplet of 2 pl, with the discharge ports having a diameter of 10 μm. A predetermined printing was conducted by filling an ink tank, connected with the recording head, with the aforementioned ink, and it was confirmed that the print was free from a disorder such as a droplet deviation. Then each of the sealing tapes prepared in Examples and Comparative Example was adhered on the front face of the recording head, which was then packed in a packaging material constituted of a silica-containing multi-layered film, heat-sealed and stored at 70° C. for 3 weeks.

After the storage, the sealing tape was peeled off and the recording head was subjected to a printing operation, and an obtained print was compared with a print before the storage:

+: no change in print, before and after storage;

−: print after storage shows a white streak caused by discharge deviation.

[Evaluation 3] Observation of Adhesive Surface, Adhered to the Discharge Port Face, Under SEM (Scanning Electron Microscope)

An adhesive surface, adhered to the discharge port face, of the sealing tape used in the printing evaluation (evaluation 2) was observed under a SEM for evaluating a chipping or a swelling of the adhesive layer:

A: adhesive being free from chipping or swelling;

B: adhesive showing slight swelling but no chipping;

C: adhesive showing swelling in parts in contact with the ink and shows chipping in some places.

[Evaluation 4] Elementary Analysis of Discharge Port in Stored Recording Head

The discharge port of the recording head, stored in Evaluation 2, was subjected to an elementary analysis by an apparatus (EPMA) of irradiating an electron beam and detecting a characteristic X-ray of each element. The analysis confirms whether a metal, derived from a member in contact with the ink, is precipitated:

A: Al, Mg or Fe not detected from a discharge port periphery;

B: Al, Mg or Fe slightly detected from a discharge port periphery;

C: Al, Mg or Fe detected from a discharge port periphery.

[Evaluation 5] Measurement of Remaining Crosslinking Agent

A tape was cut into a size of 2×2 cm, then, after the removal of the separator film, was placed in a GC ampoule (20 ml), then aged at 100° C. for 30 minutes in a stoppered state, and was subjected to a measurement of acetylacetone as a volatile component, in a head space GC/MS:

+: component derived from crosslinking agent being less than 500 mg/$m^2$;

−: component derived from crosslinking agent being equal to or more than 500 mg/$m^2$.

<Results of Evaluation>

Results of the evaluations 1-5 are shown in Table 2.

TABLE 2

| | Evaluation | | | | |
|---|---|---|---|---|---|
| | gel fraction | print evaluation | SEM observation | elementary analysis | cross-linking agent |
| Example 5 | 85 | + | A | B | + |
| Example 6 | 90 | + | A | A | + |
| Example 7 | 86 | + | B | A | + |
| Comp. Ex. 4 | 75 | − | C | — | − |

As will be seen in Table 2, the ink jet recording heads of Examples provided satisfactory results in the print evaluation and in the SEM observation. Also the results of elementary analysis indicate, in Examples, that the chelating agent in the ink is considered sufficiently effective for preventing precipitation of the metal dissolved into the ink.

This application claims priority from Japanese Patent Applications No. 2005-200221 filed on Jul. 8, 2005 and No. 2005-200946 filed on Jul. 8, 2005, which are hereby incorporated by reference herein.

What is claimed is:

1. An ink jet recording head comprising:

a recording head portion comprising a discharge port face in which a discharge port for discharging ink is provided, the discharge port face having a forward contact angle to water within a range of from 80° to 105°; and a sealing tape configured to be adhered on the discharge port face, wherein the sealing tape has a substrate and a pressure-sensitive adhesive layer, wherein the pressure-sensitive adhesive layer includes an acrylic crosslinked polymer obtained by crosslinking an alkyl(meth)acrylate ester copolymer with a metal chelate compound, wherein the alkyl(meth)acrylate ester copolymer is obtained from an alkyl(meth)acrylate ester monomer and a carboxyl group-containing monomer, and wherein the pressure-sensitive adhesive layer has a gel fraction of 85% or higher.

2. An ink jet recording head according to claim 1, wherein ink discharged from the ink jet recording head includes a chelating compound capable of forming a complex ion by reacting with a metal, and wherein the chelating compound is citric acid or a salt thereof.

3. An ink jet recording head according to claim 1, wherein the alkyl(meth)acrylate ester copolymer does not contain an OH group.

4. An ink jet recording head according to claim 1, wherein the acrylic crosslinked polymer is obtained by a crosslinking reaction carried out by heat drying at 90° C. or higher and for 4 minutes or longer.

5. A sealing tape peelably adhered to a discharge port face of a discharge port provided in an ink jet recording head, the sealing tape comprising:

a substrate; and a pressure-sensitive adhesive layer, wherein the pressure-sensitive adhesive layer includes an acrylic crosslinked polymer obtained by crosslinking an alkyl(meth)acrylate ester copolymer with a metal chelate compound, wherein the alkyl(meth)acrylate ester copolymer is obtained from an alkyl(meth)acrylate ester monomer and a carboxyl group-containing monomer, and wherein the pressure-sensitive adhesive layer has a gel fraction of 85% or higher.

6. A sealing tape according to claim 5, wherein ink discharged from the ink jet recording head includes a chelating compound capable of forming a complex ion by reacting with a metal, and wherein the chelating compound is citric acid or a salt thereof.

7. A sealing tape according to claim 5, wherein the alkyl (meth)acrylate ester copolymer does not contain an OH group.

8. A sealing tape according to claim 5, wherein the acrylic crosslinked polymer is obtained by a crosslinking reaction carried out by heat drying at 90° C. or higher and for 4 minutes or longer.

* * * * *